United States Patent Office 3,536,655
Patented Oct. 27, 1970

3,536,655
SILOXANE COMPOSITIONS USEFUL ON MASONRY SURFACES
Peter M. Burrill, Cowbridge, Glamorgan, Wales, assignor to Midland Silicones Limited, Reading, Berkshire, England
No Drawing. Filed Apr. 8, 1968, Ser. No. 719,695
Claims priority, application Great Britain, Apr. 12, 1967, 16,724/67
Int. Cl. C08g 51/28, 51/30
U.S. Cl. 260—33.6                                    3 Claims

ABSTRACT OF THE DISCLOSURE

Masonry and similar building materials can be rendered water repellent by treating them with a mixture of defined methylpolysiloxane resins, alkyl orthosilicate or a partial hydrolyzate thereof and certain organic tin compounds.

---

This invention relates to novel siloxane compositions and to the treatment of masonry and building materials therewith.

Siloxane compositions have been successfully employed for many years in the treatment of masonry and building materials to render such materials water repellent. Although excellent results have been obtained by the application of siloxanes to bricks, their performance on limestone and other similar materials of high calcium content has left much to be desired. One method which has been employed to treat limestone and like materials consists of applying thereto an alkali metal siliconate. Although successful in producing generally satisfactory water repellency on calcium-containing masonry, the alkali metal siliconates are caustic and their handling and application therefore involve certain difficulties.

It is an object of this invention to introduce novel siloxane resin compositions which are effective in producing a satisfactory standard of water repellency on masonry materials, such as Bath limestone, which have a high calcium content. Another object is a novel siloxane resin composition which is non-caustic and therefore does not suffer from the disadvantage associated with the alkali metal siliconates. A further object is a composition which is effective in rendering water repellent other types of masonry, for example clay bricks, and thus provides a single product which can be effectively employed as a water repellent composition for a wide range of masonry and similar building materials.

In accordance with this invention there is provided a process for rendering masonry and similar building materials water repellent which comprises applying thereto a composition consisting essentially of (a) 100 parts by weight of a methylpolysiloxane resin containing from 1.0 to 1.45 methyl radicals per silicon atom, (b) 20 to 120 parts by weight of an alkyl orthosilicate or a benzene soluble partial hydrolyzate thereof and (c) 5 to 15 parts by weight of an organic tin compound selected from di-butyltin dilaurate, dibutyltin diacetate, stannous octoate and dioctyltin dioctoate.

The invention further provides novel siloxane compositions comprising (a) a methylpolysiloxane resin containing from 1.0 to 1.45 methyl radicals per silicon atom, (b) an alkyl orthosilicate or benzene-soluble partial hydrolyzate thereof, and (c) an organic tin compound selected from dibutyltin dilaurate, dibutyltin diacetate, stannous octoate and dioctyltin dioctotate.

The methylpolysiloxane resin employed in the compositions of this invention contains from 1.0 to 1.45 methyl radicals per silicon atom. Preferably, however, the resin is one in which the ratio of methyl radicals to silicon atoms lies in the range from about 1.0/1 to about 1.2/1. Most preferred are the methylpolysiloxane resins obtained by hydrolysis and condensation of a methyltrihalosilane, particularly methyltrichlorosilane or a methyltrialkoxysilane, for example methyltriethoxysilane. Methods by which these methylpolysiloxane resins can be produced are well known and will be readily evident to those skilled in the art. If desired, a small proportion of organic radicals other than methyl radicals, for example ethyl, propyl or phenyl radicals can be present in the resin, but for the purpose of this invention the major proportion of the organic substituents must be methyl radicals.

As component (b) there can be present an alkyl orthosilicate or a benzene-soluble partial hydrolyzate thereof, for example tetraisopropyl silicate, butylpolysilicate, tetraethylsilicate and ethylpolysilicate, the two latter being most preferred. The proportion of the silicate or polysilicate is not narrowly critical and good results are obtained when there is employed from about 20 to 120 percent by weight of the silicate and/or the polysilicate based on the weight of the methylpolysiloxane resin, although greater or lesser amounts are also effective.

The tin compound which forms component (c) of this invention can be dibutyltin dilaurate, dibutyltin diacetate, dioctyltin dioctoate or stannous octoate. The particular suitability of these compounds is most surprising as considerably inferior performance is obtained when an organic tin compound such as butyltin trioctoate or di-octyltin dilaurate is employed. The proportion of the organic tin compound (c) can be varied within fairly wide limits but for optimum results I prefer to employ from about 5 to 15 percent by weight of this ingredient based on the weight of the methylpolysiloxane resin (a).

Application of the compositions of this invention to masonry structures and building materials is best carried out employing a solution of the components in a suitable diluent. Usually polysiloxane resins are prepared and provided in the form of a solution in an organic solvent such as toluene, xylene or other hydrocarbon solvent and at least part of the diluent for the mixture can comprise a solvent which is incorporated with the resin. The compositions can be prepared by any convenient method, for example the resin solution, the silicate component and the organic tin compound can be mixed in a concentrated form and diluted prior to use with further organic solvent. Alternatively, the solution or dispersion can be initially prepared at a dilution which renders it suitable for direct application to the masonry.

The preferred diluents for the compositions of this invention are the liquid hydrocarbons and chlorinated hydrocarbons, for example toluene, xylene and methylene chloride. The relative proportions of the diluent and active materials, that is the components (a), (b) and (c) in the applied compositions can be varied widely. In general, however, no advantage is seen in applying to the masonry substrate a solution or dispersion containing a total of more than about .20 percent by weight of the active ingredients (a), (b) and (c) and normally it is preferred to employ solutions or dispersions containing a total of from about 5 to about 15 percent by weight of the active ingredients.

The invention is applicable in the treatment of any type of masonry surface such as brick, stone, mortar, concrete, Bath limestone, cinder block and stucco.

The following examples illustrate the invention.

EXAMPLE 1

A methylpolysiloxane resin was prepared by adding a solution of methyltrichlorosilane in xylene to a hydrolysis medium consisting of a mixture of water and methyl alcohol. The hydrolysis product so obtained was neutralized and then recovered as a solution in xylene. The methylpolysiloxane resin was obtained at a 50 percent weight solution of resin solids in xylene, the solution having a viscosity of 4 cs. at 25° C.

10 parts by weight of the methylpolysiloxane resin solution, 2 parts by weight of tetraethyl orthosilicate and 0.5 parts by weight of dibutyltin dilaurate were then added in turn with stirring to about 50 parts by weight of toluene until a homogeneous solution was obtained. A further quantity of toluene was then added to provide a solution containing 5 percent by weight of the resin, 2 percent by weight of tetraethylorthosilicate and 0.5% of the tin compound. This solution was applied to several types of bricks by dipping, the bricks being immersed in the solution and thereafter being allowed to dry at room temperature for 3 days. The treated bricks were then weighed and submerged to a depth of 3 mm. in water with one of the broadest faces resting on wooden support slats positioned below the surface of the water. Untreated bricks were also similarly tested as controls.

After 7 days immersion the gain in weight of the bricks due to water adsorption was measured. The results obtained were as follows and show the general applicability of the water repellent compositions of this invention.

| Test substrate | Percent water absorption | |
| --- | --- | --- |
|  | Untreated | Treated |
| Leicester red bricks | 12.0 | 0.1 |
| Sand-lime bricks | 12.0 | 0.3 |
| Sand-cement bricks (3:1 v./v.) | 6.5 | 0.7 |
| Bath limestone bricks | 11.0 | 1.0 |
| Monks Park limestone bricks | 10.0 | 0.5 |
| Cast stone | 6.5 | 1.7 |
| Darley Dale sandstone | 3.4 | 0.5 |

EXAMPLE 2

A solution was prepared which was similar to that employed in Example 1 except that the dibutyltin dilaurate was replaced with an equal weight of dibutyltin diacetate.

This solution was employed to treat by dipping a brick of Bath limestone, of dimensions 3″ x 2″ x 2″. After the brick had been allowed to dry for 3 days at 25° C., it was tested in the manner described in Example 1 and was found to have absorbed only 1.5 percent of its weight of water after 7 days.

When the experiment was twice repeated with the dibutyltin diacetate replaced in turn with butyltin trisoctoate and dioctyltin dilaurate, the water pick-up by the brick was found to be 10.1 percent and 9.5 percent respectively.

EXAMPLE 3

A solution was prepared which was similar to that employed in Example 1 except that tetraethyl orthosilicate was replaced by ethyl polysilicate. The solution was employed to treat by dipping a brick of Bath limestone. After the brick had been allowed to dry for 3 days at 25° C., it was tested in the manner described in Example 1 and was found to have absorbed only 0.6% of its weight of water after 14 days.

EXAMPLE 4

A composition was prepared which consisted of toluene containing in solution 10 percent by weight of the methylpolysiloxane resin solution of Example 1, 5 percent by weight of ethyl polysilicate and 1 percent of stannous octoate. The solution was employed to treat a Bath limestone brick which was then allowed to dry and tested in the manner described in Example 1.

After 7 days immersion the water pick-up was found to be 0.9% by weight.

That which is claimed is:

1. A composition consisting of (a) 100 parts by weight of a methylpolysiloxane resin containing from 1.0 to 1.45 methyl radicals per silicon atom, (b) 20 to 120 parts by weight of an alkyl orthosilicate or partial hydrolyzate thereof, and (c) 5 to 15 parts by weight of an organic tin compound selected from dibutyltin dilaurate, dibutyltin diacetate, stannous octoate and dioctyltin dioctoate.

2. A composition as claimed in claim 1 wherein the methylpolysiloxane resin contains from 1.0 to 1.2 methyl radicals per silicon atom.

3. A composition as claimed in claim 1 which also contains an organic solvent.

References Cited

UNITED STATES PATENTS

| 2,706,723 | 4/1955 | Bass | 260—825 |
| 2,902,407 | 9/1959 | Chipman. | |
| 2,927,909 | 3/1960 | Lyons et al. | 260—825 |
| 3,028,347 | 4/1962 | Chevalier. | |
| 3,186,963 | 6/1965 | Lewis et al. | |
| 3,372,052 | 3/1968 | Pelniaszek. | |

MORRIS LIEBMAN, Primary Examiner

L. T. JACOBS, Assistant Examiner

U.S. Cl. X.R.

260—33.8, 46.5